United States Patent
Ikeda et al.

(10) Patent No.: US 7,627,396 B2
(45) Date of Patent: Dec. 1, 2009

(54) INDUSTRIAL ROBOT

(75) Inventors: Tatsuya Ikeda, Hyogo (JP); Kunitoshi Morita, Hyogo (JP); Toshiyuki Mishima, Osaka (JP)

(73) Assignee: Panasonic Corporation, Osaka (JP)

( * ) Notice: Subject to any disclaimer, the term of this patent is extended or adjusted under 35 U.S.C. 154(b) by 706 days.

(21) Appl. No.: 10/534,669

(22) PCT Filed: Nov. 5, 2004

(86) PCT No.: PCT/JP2004/016411
§ 371 (c)(1),
(2), (4) Date: May 11, 2005

(87) PCT Pub. No.: WO2005/065894
PCT Pub. Date: Jul. 21, 2005

(65) Prior Publication Data
US 2006/0106471 A1  May 18, 2006

(30) Foreign Application Priority Data
Jan. 8, 2004 (JP) ............................. 2004-002728

(51) Int. Cl.
*G05B 15/00* (2006.01)
(52) U.S. Cl. .................. 700/264; 700/248; 700/245; 700/246; 700/247; 700/249; 700/250; 700/251; 700/256; 318/568.1; 318/568.11; 318/568.13; 318/568.16; 318/573; 701/200; 701/213; 701/217; 701/220; 701/23; 361/680; 361/683; 901/1; 901/4; 901/6; 901/9; 901/30
(58) Field of Classification Search ............ 700/248, 700/245, 246, 247, 249, 250, 251, 254, 256, 700/264; 318/568.1, 568.11, 568.13, 568.16, 318/573, 574; 701/200, 213, 217, 220, 23, 701/28, 47; 714/4, 15, 23, 24, 490.01; 361/680, 361/683; 901/1, 4, 6, 9, 30, 41, 46, 47, 48, 901/49
See application file for complete search history.

(56) References Cited

U.S. PATENT DOCUMENTS 6,332,102 B1 * 12/2001 Nakajima et al. ........... 700/245

(Continued)

FOREIGN PATENT DOCUMENTS

JP        58-129503        8/1983

(Continued)

OTHER PUBLICATIONS

FANUC Robotics, Customer Training Schedule, 2002, Internet, p. 1-23.*
European Search Report Dated Oct. 15, 2007.
Japanese Office Action.

*Primary Examiner*—Khoi Tran
*Assistant Examiner*—Mcdieunel Marc
(74) *Attorney, Agent, or Firm*—Pearne & Gordon LLP

(57) ABSTRACT

There is provided an industrial robot which comprises a manipulator having a tool at the tip end, a robot control unit for controlling the manipulator, and a primary teaching device and subsidiary teaching device for controlling the manipulator through the robot control unit, wherein operation capable of being conducted by the subsidiary teaching device is restricted as compared with operation capable of being conducted by the primary teaching device. By realizing the industrial robot, it is possible to prevent a production line worker from executing a function of the robot which is originally to be executed by a supervisor.

6 Claims, 17 Drawing Sheets

U.S. PATENT DOCUMENTS

| | | | |
|---|---|---|---|
| 6,804,580 B1 * | 10/2004 | Stoddard et al. | 700/248 |
| 6,853,881 B2 * | 2/2005 | Watanabe et al. | 700/264 |
| 7,245,990 B2 * | 7/2007 | Watanabe et al. | 700/264 |
| 7,353,081 B2 * | 4/2008 | Skourup et al. | 700/245 |
| 7,373,220 B2 * | 5/2008 | Watanabe et al. | 700/264 |
| 7,376,488 B2 * | 5/2008 | Watanabe et al. | 700/264 |

FOREIGN PATENT DOCUMENTS

| | | |
|---|---|---|
| JP | 03-286208 | 12/1991 |
| JP | 05-019841 A | 1/1993 |
| JP | 6-250729 | 9/1994 |
| JP | 7-20924 | 1/1995 |
| JP | 2796169 | 6/1998 |
| JP | 2001-318715 | 11/2001 |
| JP | 2002-239953 | 8/2002 |
| WO | 91-04521 | 4/1991 |
| WO | 03-086716 | 10/2003 |

* cited by examiner

INDUSTRIAL ROBOT

TECHNICAL FIELD

The present invention relates to an industrial robot having a function of restricting the operation conducted by a worker.

Recently, industrial robots have been widely introduced into industrial production lines and the production lines have been automated. Further, the number of workers working in the production lines has been reduced and the manufacturing cost has been decreased. According to the advance of introducing the industrial robots into the production lines, supervisors or programmers belonging to the production technique department, who have full knowledge of the industrial robots, conduct the setting of the operation environment and the operation program of the industrial robots, and the workers belonging to the production lines are permitted to start and stop the robots and conduct a simple correction of the program in many cases.

In the conventional industrial robot, the following problems may be encountered. When the robot is operated by a worker while a task is being allotted to the worker, in the case where a function of the industrial robot, which is exclusively to be executed by a supervisor, is mistakenly executed by the worker, the setting of the robot operation is changed without letting the supervisor know the change. Therefore, problems are unexpectedly caused in the circumstances. In order to prevent the occurrence of the above problems, some industrial robots are provided with a security function. Specifically, the industrial robots include: a name inputting means for inputting the name of a worker; and a discrimination means for discriminating the inputted name, wherein the operation capable of being conducted by the worker is restricted by the result of the discrimination. For example, this technique is disclosed in the official gazette of JP-A-2002-239953.

Since the skill of one worker is different from the skill of another worker, in some industrial robots, a message corresponding to the skill of the worker is displayed in a teaching device. Specifically, the industrial robots include: a sill level judging means for judging a content of the operation executed by a worker; and a changing means for changing a message for supporting the operation and a content of the operating image plane according to the result of the judgment. For example, this technique is disclosed in the official gazette of Japanese Patent No. 2796160.

Further, there is provided a robot controller teaching system including: a programming device operated by a personal computer for general purpose; and a simple teaching device composed of a small number of switches. For example, this technique is disclosed in the official gazette of JP-A-6-250729.

FIG. 18 is a view showing an arrangement of the conventional industrial robot. Reference numeral 1801 is a manipulator, reference numeral 1809 is a tool such as a welding torch or a hand opening and closing device which is attached to the manipulator 1801 according to the purpose of the use of the industrial robot, reference numeral 1802 is a robot control unit for controlling the manipulator, reference numeral 1808 is a teaching device for operating the manipulator and the robot control unit, reference numeral 1803 is CPU for controlling the robot control unit itself, reference numeral 1804 is a corresponding section for conducting correspondence with the teaching device, reference numeral 1805 is ROM which is a read-only memory exclusively used for accommodating and reading a program which is interpreted by CPU so that CPU can be operated, reference numeral 1806 is RAM which is a random access memory for writing and reading an operation program and operation environment setting data taught by the worker, and reference numeral 1807 is a drive section for driving the manipulator.

Explanations will be made into the operation of the industrial robot composed as described above. A worker operates the manipulator 1801 with the teaching device 1808. An operation command sent from the teaching device 1808 is transmitted to CPU 1803 via the corresponding section 1804. CPU 1803 controls the drive section 1807 so that the manipulator 1801 can be operated. The worker operates the manipulator 1801 to an objective position and posture and then conducts a teaching point registration operation. Due to the foregoing, the position and posture of the manipulator 1801 are stored in RAM 1806. When this operation is successively conducted, the operation program can be made. In the case where the operation program is continuously operated so as to make the industrial robot conduct welding or handling work, the worker selects an objective operation program with the teaching device 1808 and conducts a starting operation. Then, CPU 1803 interprets the operation program so that the manipulator 1801 can be continuously controlled. Due to the foregoing, the industrial robot can be continuously operated as desired by the worker.

In the conventional industrial robot, there is a possibility that a worker mistakenly or intentionally executes a function of the industrial robot, which is originally to be operated by a supervisor, and the setting of the industrial robot is changed. Further, in the case where the worker does not have full knowledge of the method of operation of the industrial robot, there is a possibility that unexpected problems are caused by an erroneous operation and further there is a possibility that a dangerous state might occur in the industrial robot.

Patent Document 1: Official gazette of JP-A-2002-239953
Patent Document 2: Official gazette of Japanese Patent No. 2796160
Patent Document 3: Official gazette of JP-A-6-250729

DISCLOSURE OF THE INVENTION

It is an object of the present invention to prevent the occurrence of unexpected problems and the generation of a dangerous state by providing an industrial robot including a primary teaching device and a subsidiary teaching device and further including a function of restricting the operation of a robot capable of being conducted by the subsidiary teaching device when a worker uses the subsidiary teaching device, the operation of which is restricted.

By realizing an industrial robot including a primary teaching device and a subsidiary teaching device and further including a function of restricting the operation of a robot capable of being conducted by the subsidiary teaching device, it is possible to prevent a worker belonging to a production line from executing a function of the industrial robot which is originally to be executed by a supervisor.

By realizing an industrial robot characterized in that the operation capable of being conducted by a subsidiary teaching device is determined by a primary teaching device, a supervisor can determine the operation, which is capable of being conducted by a worker belonging to a production line, with a primary teaching device.

When operation capable of being conducted by a subsidiary teaching device is classified as a user level by a primary teaching device, an industrial robot is realized, the subsidiary teaching device of which is provided with a user level judging function. Due to the foregoing, a supervisor determines the operation, which can be conducted with the subsidiary teaching device by a production line worker or programmer, with the primary teaching device and classifies as a user level. Therefore, when the production line worker or programmer operates the subsidiary teaching device, the contents, which can be operated by the worker or programmer when the worker or programmer inputs the user level of himself into the subsidiary teaching device, can be restricted. In this way, it becomes possible for the production line worker or programmer to have a plurality of levels when the production line worker or programmer operates the subsidiary teaching device.

By realizing an industrial robot in which a primary teaching device and a subsidiary teaching device are replaced with each other, when the primary teaching device is controlled by a supervisor, a production line worker operates only the subsidiary teaching device, the operation of which is restricted. Due to the foregoing, it is possible to prevent the production line worker from executing a function of the industrial robot which is originally to be executed only by the supervisor.

By realizing an industrial robot having a robot control unit to store information for restricting the operation when a primary teaching device or a subsidiary teaching device is connected to the robot control device, the contents of restriction determined by a supervisor are stored in the robot control unit, and the contents of restriction are read by the robot control unit when a production line worker uses the subsidiary teaching device. Due to the foregoing, it is possible to prevent the production line worker from executing a function of the industrial robot which is originally to be executed only by the supervisor.

By realizing an industrial robot in which a primary teaching device and a subsidiary teaching device are simultaneously connected to the robot control unit and the primary teaching device is provided with a user judging function of, when the primary teaching device is operated only by a supervisor and the subsidiary teaching device is operated only by a production line worker, it is possible to prevent the production line worker from executing a function of the industrial robot which is originally to be executed only by the supervisor.

As described above, the present invention realizes an industrial robot including a primary teaching device, a subsidiary teaching device and also including a function of restricting the operation capable of being conducted by the subsidiary teaching device. Due to the foregoing, when the production line worker uses only the subsidiary teaching device, it is possible to prevent the production line worker from executing a function of the industrial robot which is originally to be executed only by the supervisor.

BEST MODE FOR CARRYING OUT THE INVENTION

Embodiment 1

Figure 1:
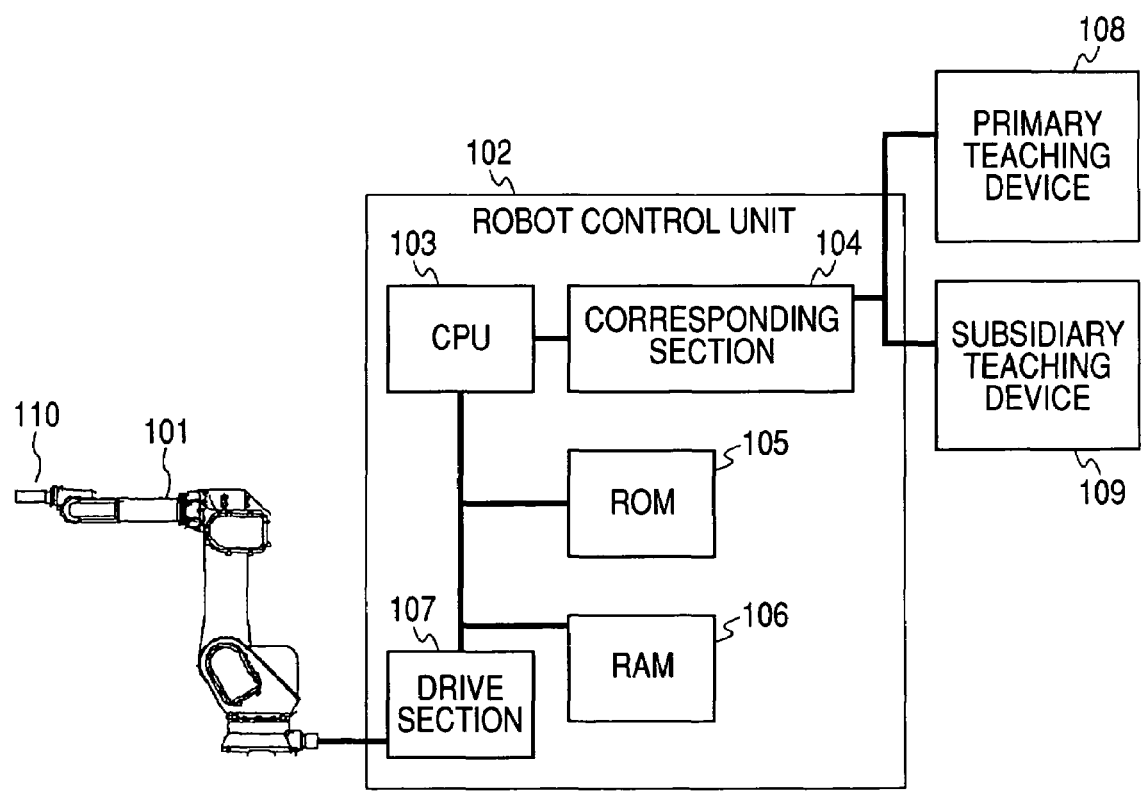
FIG. 1 is a block diagram showing an overall arrangement of Embodiment 1 of the industrial robot of the present invention.
Figure 2:
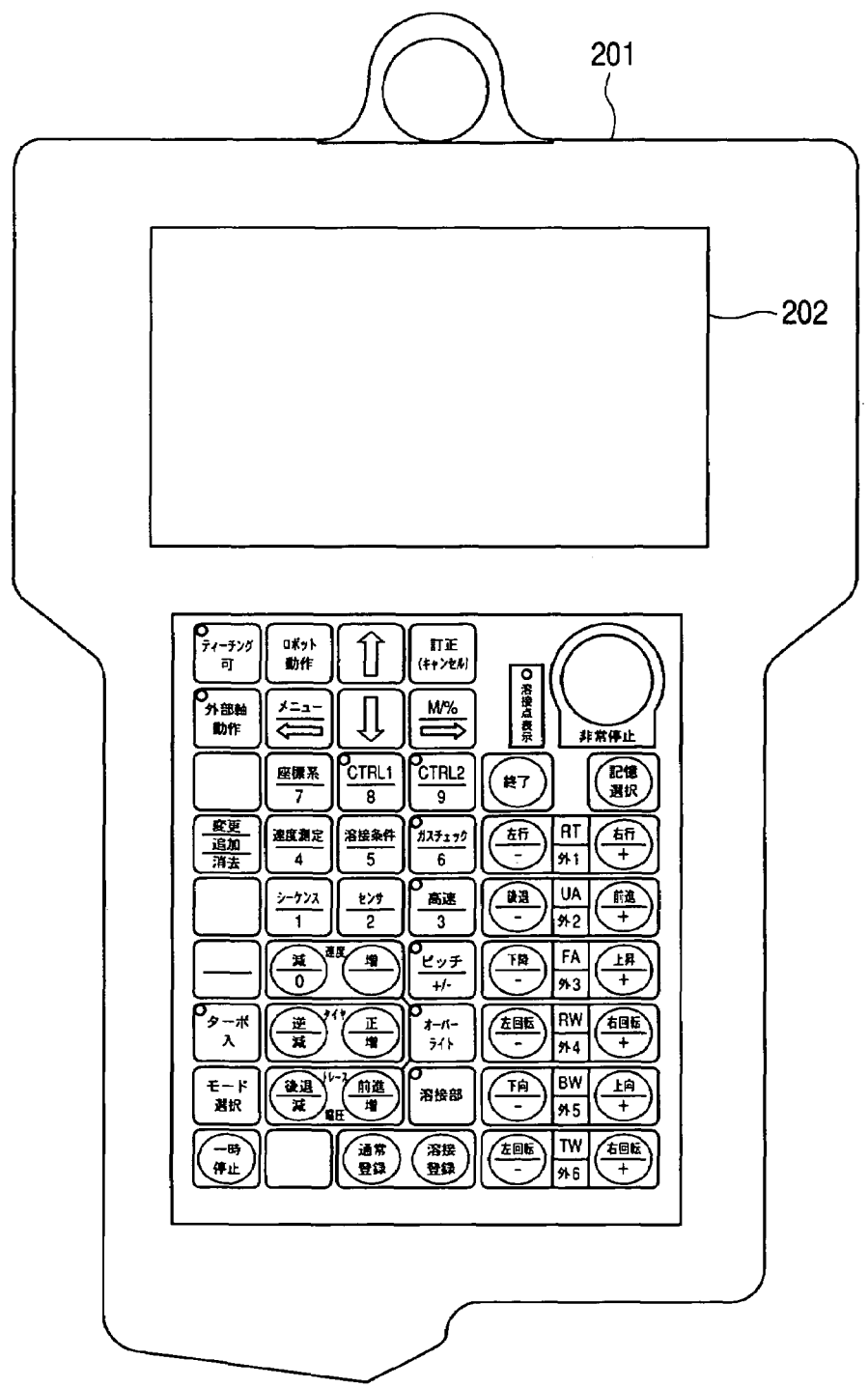
FIG. 2 is a front view showing a primary teaching device of Embodiment 1 of the industrial robot of the present invention.
Figure 3:
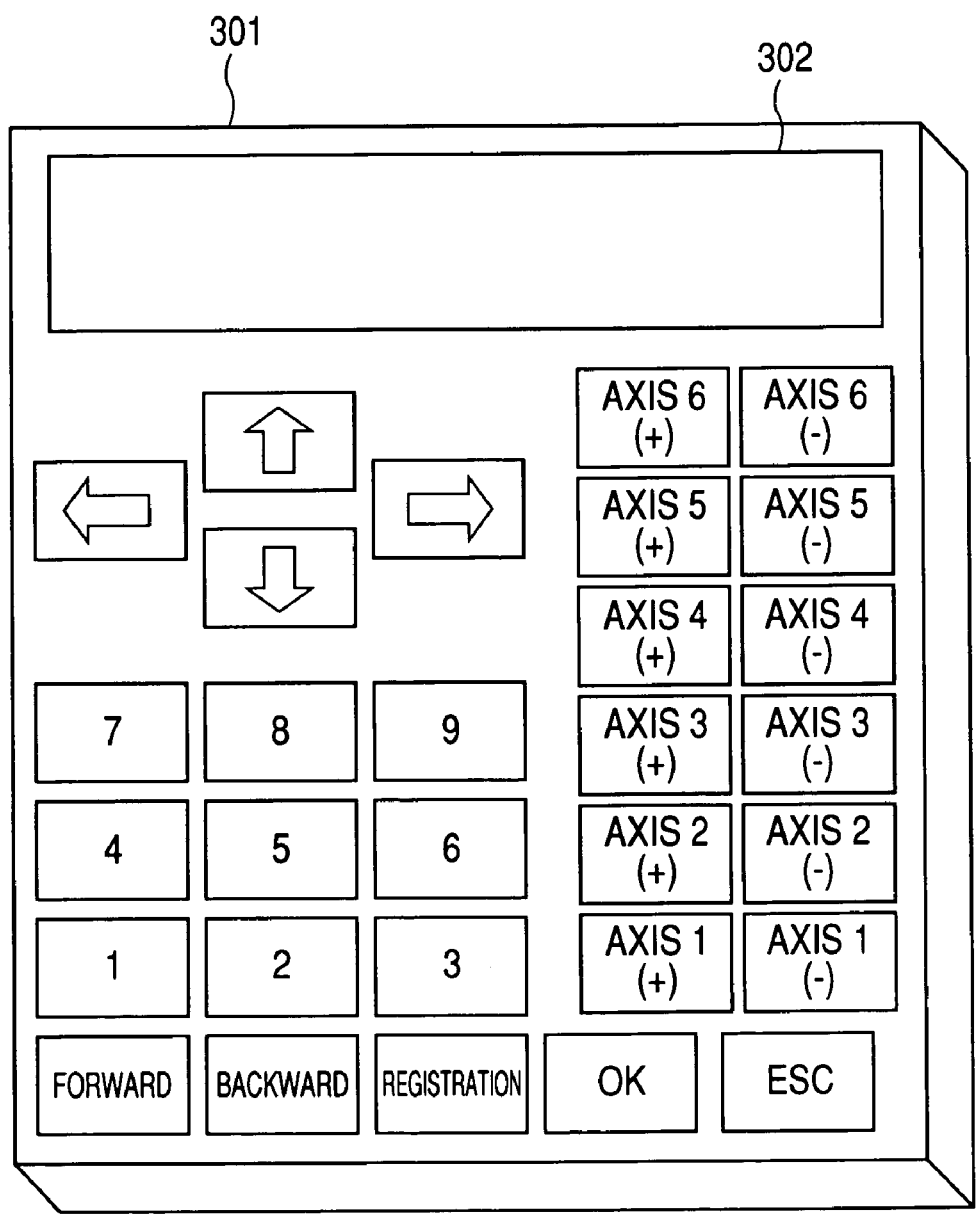
FIG. 3 is a front view showing a subsidiary teaching device of Embodiment 1 of the industrial robot of the present invention.

Referring to FIGS. 1 to 3, the most preferred embodiment of the present invention will be explained below. FIG. 1 is a view showing an arrangement of the industrial robot to realize the present invention. The reference numeral 101 is a manipulator, reference numeral 102 is a robot control unit for controlling the manipulator, reference numeral 103 is CPU for controlling the robot control unit itself, reference numeral 104 is a corresponding section for conducting correspondence with a teaching device, reference numeral 105 is ROM exclusively used for accommodating and reading out a program to be interpreted by CPU so that CPU can be operated, reference numeral 106 is RAM capable of accommodating, writing and reading an operation program, which has been taught by a worker, and data for setting the operation environment, reference numeral 107 is a drive section for driving the manipulator, reference numeral 108 is a primary teaching device provided for controlling the manipulator 101 through the robot control unit 102, and reference numeral 109 is a subsidiary teaching device provided for controlling the manipulator 101 through the robot control unit 102 in the same manner as that of the primary teaching device 108.

The primary teaching device is prepared as a teaching device with which a supervisor conducts operation, and the subsidiary teaching device is prepared as a teaching device with which a production worker conducts operation. For example, the supervisor assumes a role of newly making a teaching program with the primary teaching device 108. On the other hand, the production line worker assumes a role of correcting a teaching program of the industrial robot which is in operation in the production line. A specific example of the primary teaching device 108 is shown by reference numeral 201 in FIG. 2. In the primary teaching device 201, a large number of operation keys are arranged so that the supervisor can conduct a large number of types of work permitted only to the supervisor. The liquid crystal image plane 202 mounted on the primary teaching device 108 is highly fine.

Next, a specific example of the subsidiary teaching device 109 is shown by reference numeral 301 in FIG. 3. The subsidiary teaching device 301 includes a necessary minimum number of operation keys so that the production line worker can easily correct a teaching program in the industrial robot which is in operation. The liquid crystal image plane mounted on the subsidiary teaching device 109 has a necessary minimum indication capacity. In the subsidiary teaching device 109 or 301, only a change in the teaching point in the teaching program is permitted, and a function of making an addition of the teaching point and a function of making a deletion of the teaching point are not mounted on the subsidiary teaching device 109 or 301. In this case, the change in the teaching point indicates a change in the tip end position of the tool 110, which is attached to the end portion of the manipulator 101, and a change in the teaching point accompanied by a change in the tool posture.

The operation of the industrial robot composed as described above will be explained below. The supervisor controls the manipulator 101 by operating the robot control unit 102 with the primary teaching unit 108. Specifically, an operation command sent from the primary teaching device 108 is transmitted to CPU 103 through the corresponding section 104, and CPU 103 executes a control program to control the drive section 107, so that the manipulator 101 can act by the action of the drive section 107. The supervisor operates the manipulator 101 to an objective position and posture and conducts the operation to register a teaching point for each position and posture with the primary teaching device 108. For example, when the manipulator 101 is operated and the registration is made by the primary teaching device for each teaching point previously determined, the position and posture of the manipulator 101 are registered in RAM 106 as the coordinates information of three dimension. Due to the foregoing, the position and posture of the manipulator 101 are stored in RAM 106. Therefore, when this operation is successively conducted for each position to be registered as a teaching point, the operation program can be made.

Next, in the case where the thus made operation program is continuously operated by the supervisor so as to make the industrial robot conduct welding or handling, the supervisor selects and executes an objective program with the primary teaching device 108 and starts the operation. Due to the foregoing, CPU 103 interprets the operation program and gives a command of operating the manipulator 101 to the drive section, and then the work can be executed when the manipulator 101 passes through the teaching points previously registered.

Next, the production line worker corrects a teaching program of the industrial robot, which is in operation in the production line, as follows. When the production worker stops the industrial robot, which is in operation in the production line, with the subsidiary teaching device 109, CPU 103 interprets the command of stoppage given by the production worker, so that the manipulator 101 can be stopped. Next, the production line worker operates the manipulator 101 to an objective position and posture with the subsidiary teaching device so as to correct the teaching point. Due to the foregoing, the position and posture of the manipulator 101 can be overwritten and stored in RAM 106 as the coordinates information. When this operation is successively conducted, the operation program can be corrected.

In this case, in the subsidiary teaching device 109, only a change in the teaching point in the teaching program is permitted, and the other operation is prohibited. Therefore, the production line worker working with this subsidiary teaching device 109 can not conduct the operation of adding and deleting teaching points.

Next, in the case where the production line worker continuously operates the operation program and makes the industrial robot conduct welding or handling, in the same manner as that of using the primary teaching device 108 described before, the production line worker selects an objective operation program with the subsidiary teaching device 109 and starts operation. Due to the foregoing, CPU 103 interprets the operation program and continuously controls the manipulator 101.

As described above, according to this embodiment, when the embodiment is provided with a function of restricting the operation capable of being conducted by the subsidiary teaching device and the production line worker uses only the subsidiary teaching device, the production line worker can be prevented from executing the industrial robot function which is originally to be executed by the supervisor. In this connection, the restriction of the operation, which can be conducted by the subsidiary teaching device in the present embodiment, will be described in detail later, which is the same in the cases of Embodiments 2 to 4.

Embodiment 2

Figure 4:
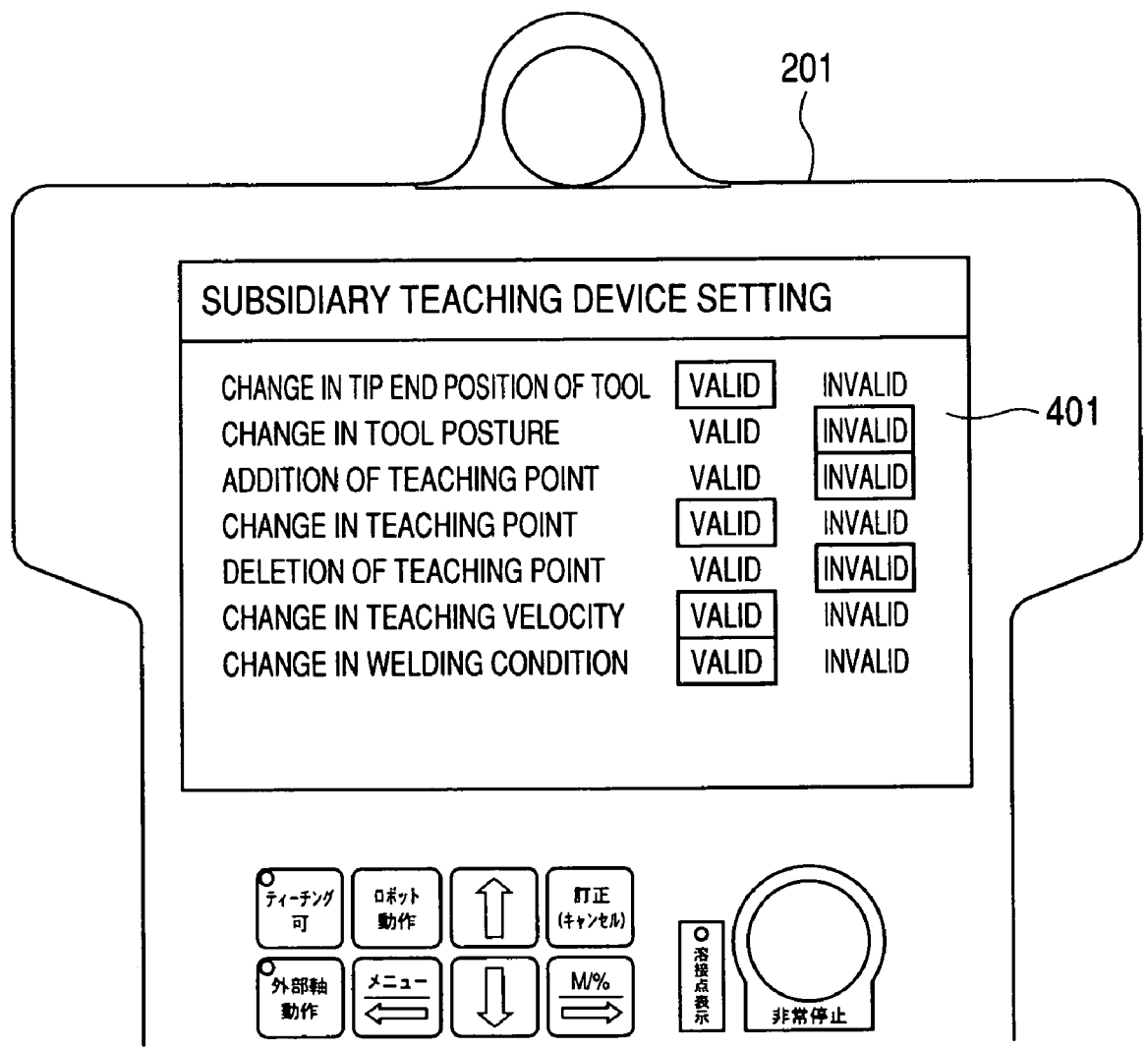
FIG. 4 is a front view showing an image plane of setting a subsidiary teaching device of Embodiment 2 of the industrial robot of the present invention.

Next, referring to FIGS. 1 to 6, the function of restricting the operation, which can be conducted by the subsidiary teaching device, will be explained below. Like reference characters are used to indicate like parts in Embodiments 1 and 2, and the detailed explanations are omitted here. The supervisor calls a setting image plane to restrict the operation, which can be conducted by the subsidiary teaching device, with the primary teaching device 108. Then, the subsidiary teaching device setting image plane 401 shown in FIG. 4 is displayed on the liquid crystal image plane. The supervisor sets the function of permitting the operation conducted by the subsidiary teaching device on the subsidiary teaching device setting image plane 401 in validity and also sets the operation, which is not permitted to conduct by the subsidiary teaching device, in invalidity.

The operation which has been set invalid at this time will be described in detail in RAM 109 or Embodiment 5. Information that the operation conducted by the subsidiary teaching device 109 is invalid is accommodated in the restriction information storing region 1201 shown in FIG. 13. In this connection, how to restrict the operation of the subsidiary teaching device 109 will be described in Embodiment 5.

Next, explanations will be made into a case in which the production line worker works with the subsidiary teaching device 109. For example, as shown on the subsidiary teaching device setting image plane 401 of FIG. 4, the supervisor conducts setting with the primary teaching device 108 as follows. The tool tip end position change is valid, the tool posture change is invalid, the teaching point addition is invalid, the teaching point change is valid, the deletion of the teaching point is invalid, the teaching point velocity change is valid, and the welding condition change is valid. In this case, the teaching point change operation itself is permitted, however, the tool posture change is not permitted. Under the above circumstances, the production line worker operates the industrial robot with the subsidiary teaching device 109 and changes the tool posture and then changes the teaching point. In this case, as shown by the warning indication 501 of FIG. 5, the indication that the operation is not permitted is displayed, and the teaching point change operation accompanied by a tool posture change can not be executed.

Figure 6:
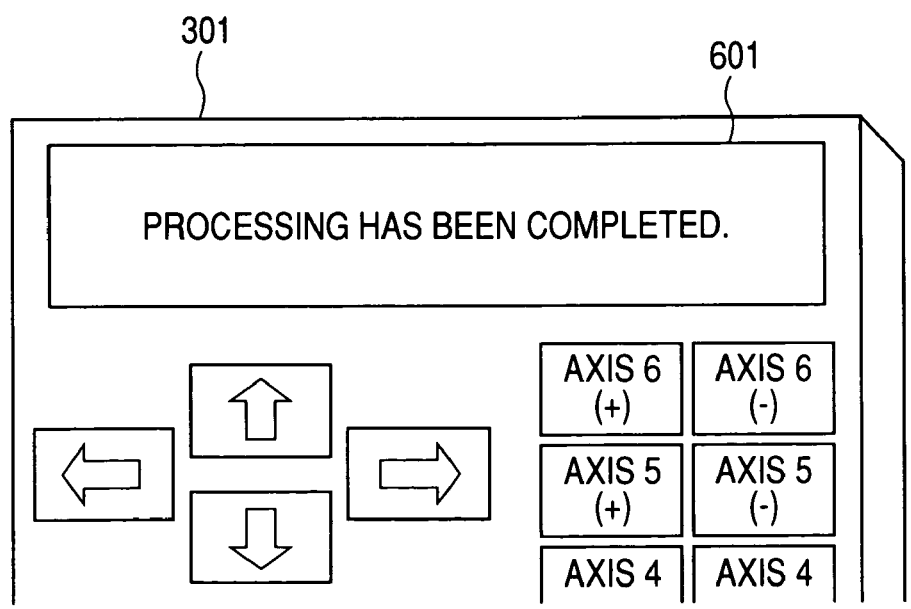
FIG. 6 is a front view showing an indication of completion in Embodiment 2 of the industrial robot of the present invention.

Successively, in the case where the teaching point change operation itself is permitted and the production line worker operates the industrial robot with the subsidiary teaching device 109 under the condition that the tool tip end position change is permitted so that the tool tip end position can be changed and then the production line worker conducts the teaching point change operation, as shown by the completion indication 601 in FIG. 6, the indication that the processing has been completed is displayed. Therefore, the teaching point change operation accompanied by the tool tip end position change is executed.

In the same manner as that described above, for example, as shown on the subsidiary teaching device setting image plane 401 of FIG. 4, the supervisor conducts setting with the primary teaching device 108 as follows. The tool tip end position change is valid, the tool posture change is invalid, the teaching point addition is invalid, the teaching point change is valid, the deletion of the teaching point is invalid, the teaching point velocity change is valid, and the welding condition change is valid. In the case where the production line worker conducts the teaching point addition operation, the warning indication 501 is displayed, and the processing can not be executed. In the case where the production line worker conducts the teaching point deletion operation, the warning indication 501 is displayed, and the processing can not be executed. In the case where the production line worker conducts the teaching velocity change operation, the completion indication 601 is displayed and the processing can be executed. In the case where the production line worker conducts the welding condition change operation, the completion indication 601 is displayed and the processing can be executed.

As described above, this embodiment is provided with the function of restricting the operation capable of being conducted by the subsidiary teaching device, and the production line worker uses only the subsidiary teaching device. Due to the foregoing, the production line worker can be prevented from executing the function of the industrial robot which is originally to be executed by the supervisor.

In this connection, in Embodiment 1, the items, which can be set by the supervisor with the primary teaching device 108 to be valid or invalid on the subsidiary teaching device setting image plane 401 shown in FIG. 4, are the change in the tool tip end position, the change in the tool posture, the addition of the teaching point, the deletion of the teaching point, the change in the teaching point velocity, and the change in the welding condition. However, the function of setting to be valid or invalid on the subsidiary teaching device setting image plane 401 is not particularly limited. For example, the change in the output state, the change in the waiting time and the change of ON/OFF of the hand opening and closing device may be set on the subsidiary teaching device setting image plane 401.

Embodiment 3

Figure 7:
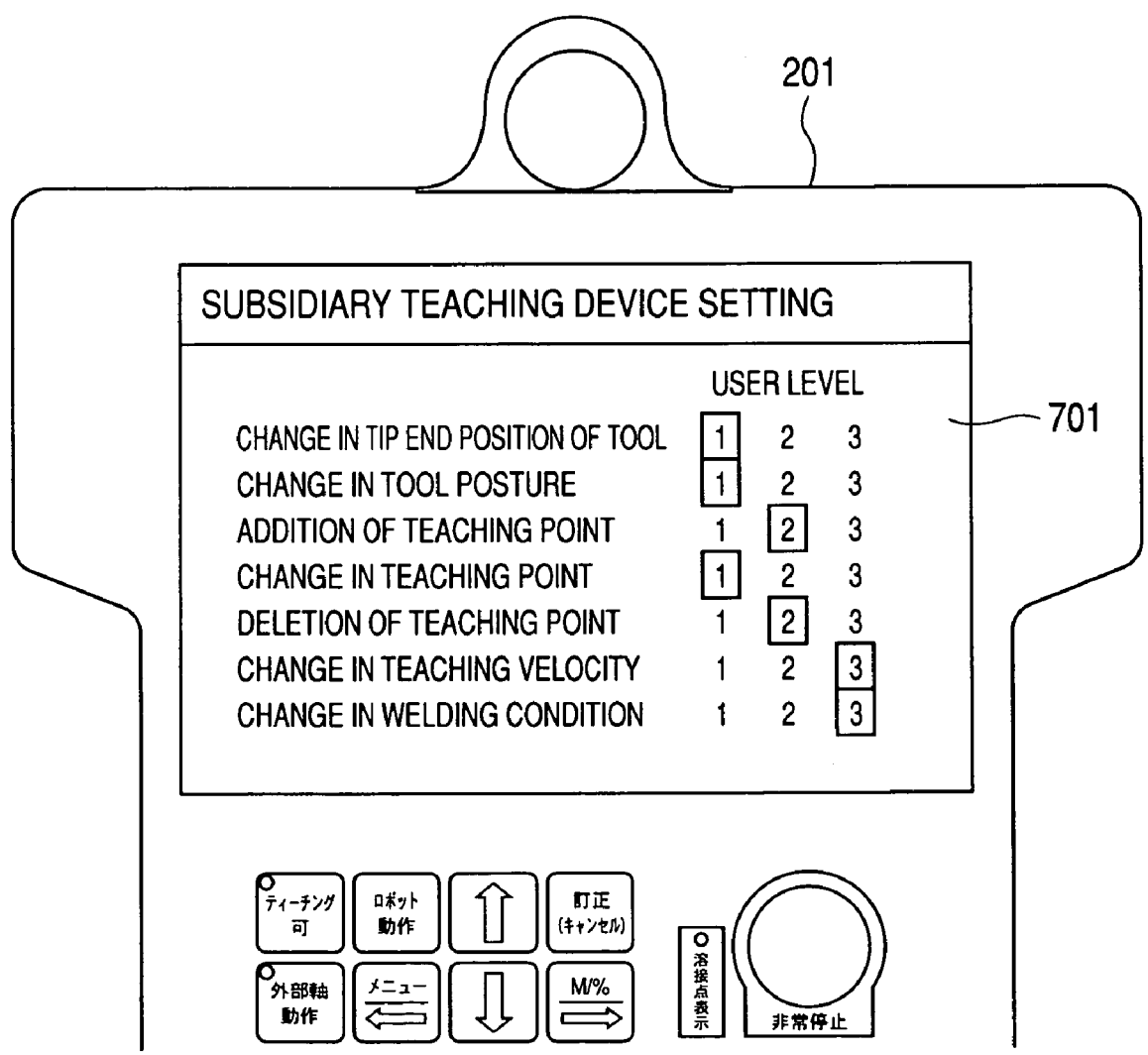
FIG. 7 is a front view showing an image plane of setting a subsidiary teaching device of Embodiment 3 of the industrial robot of the present invention.

Next, referring to FIGS. 1 to 9, explanations will be made into the arrangement in which the operation capable of being conducted by the subsidiary teaching device is classified as a user level by the primary teaching device and the subsidiary teaching device is made to have a user level judging function. Like reference characters are used to indicate like parts in Embodiments 1 and 3, and the detailed explanations are omitted here. When the supervisor calls a setting image plane for setting the operation, which can be conducted by the subsidiary teaching device 109, with the primary teaching device 108, the subsidiary teaching device setting image plane 701 shown in FIG. 7 is displayed in the liquid crystal image plane.

The supervisor classifies the functions, the operation of which is permitted so that it can be conducted by the subsidiary teaching device, to three stages as the user level on the subsidiary teaching device setting image plane 701.

In this case, the user level 3 represents the highest level. The function, which is set at the user level 3 on the subsidiary teaching device setting image plane 701, can be operated only by a person of the user level 3. For example, a supervisor in charge of the production line operates this function.

Next, the user level 2 represents the intermediate level. The function, which is set at the user level 2 on the subsidiary teaching device setting image plane 701, can be operated only by persons of the user levels 2 and 3. For example, a programmer permitted to add and delete the teaching points corresponds to the person of the user level 2.

Next, the user level 1 represents the lowest level. The function, which is set at the user level 1 on the subsidiary teaching device setting image plane 701, can be operated only by persons of the user levels 1, 2 and 3. For example, a production line worker permitted to change the teaching points corresponds to the person of the user level 1.

Next, explanations will be made into a case in which the production line worker works with the subsidiary teaching device 109. For example, the supervisor conducts setting as follows with the primary teaching device 108 as shown in the subsidiary teaching device setting image plane 701 of FIG. 7. The change in the tool tip end position is the user level 1, the change in the tool posture is the user level 1, the addition of the teaching point is the user level 2, the change in the teaching point is the user level 1, the deletion of the teaching point is the user level 2, the change in the teaching point velocity is the user level 3, and the change in the welding condition is the user level 3.

Figure 9:
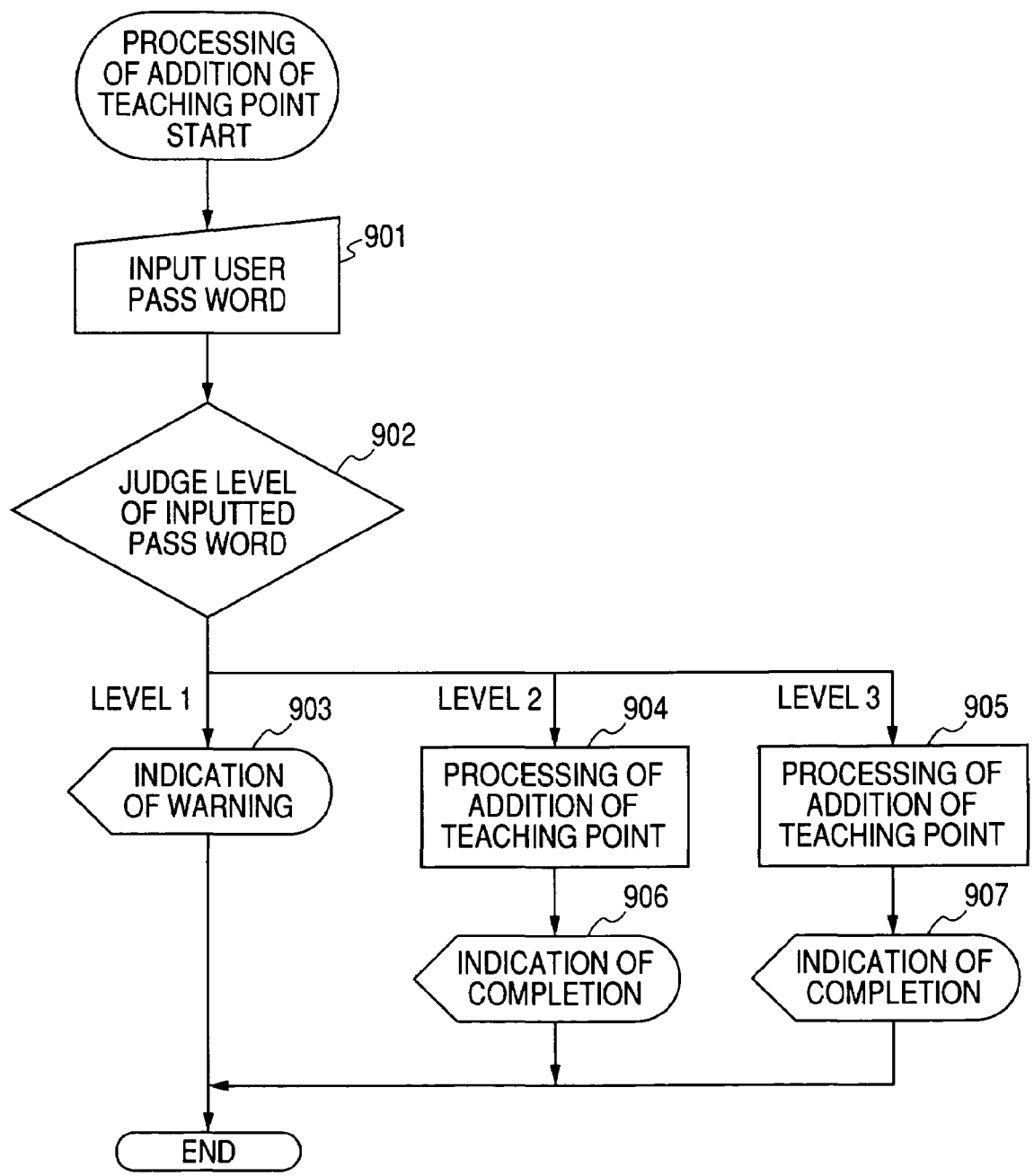
FIG. 9 is a flow chart of processing in Embodiment 3 of the industrial robot of the present invention.

In this case, FIG. 9 shows a case of processing in which the production line worker of the user level 1 operates an industrial robot with the subsidiary teaching device 109 and conducts the operation of adding the teaching point. Since the production line worker is the user level 1, the operation of adding the teaching point is not permitted according to the subsidiary teaching device setting image plane 701 shown in FIG. 7 which has been set by the supervisor with the primary teaching device 108.

Figure 8:
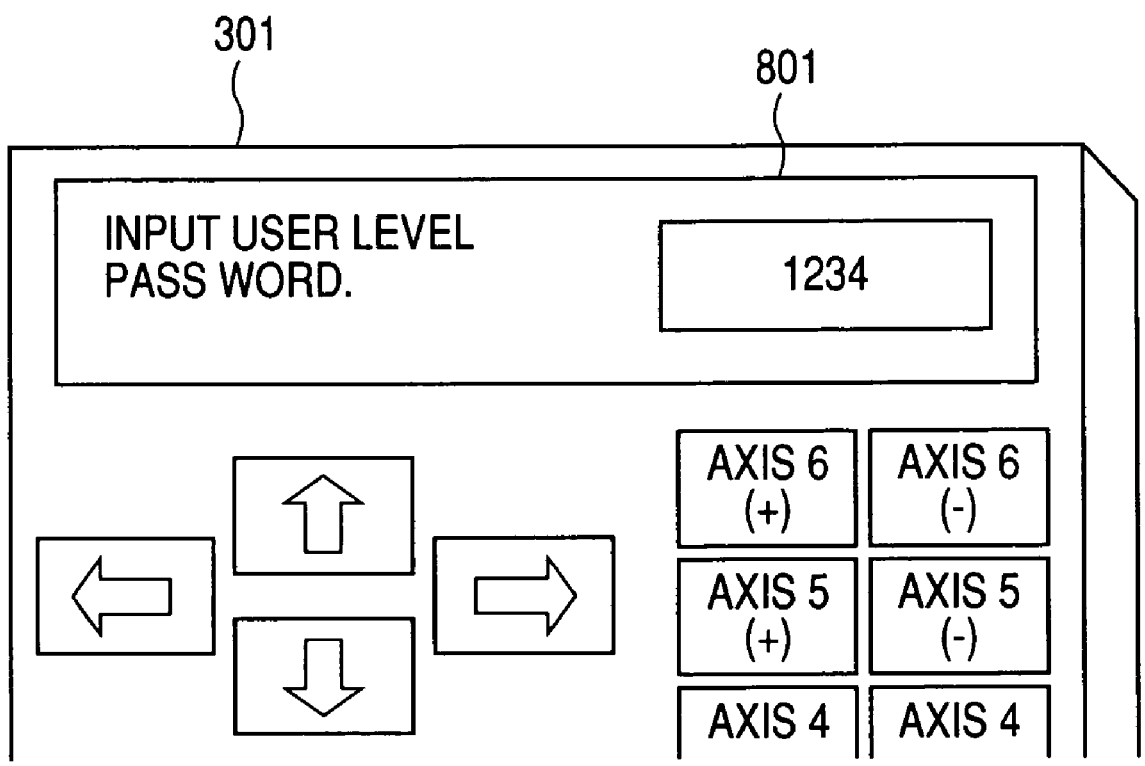
FIG. 8 is a front view showing an image plane of inputting a user level pass word in Embodiment 3 of the industrial robot of the present invention.

In the case where the production line worker conducts the teaching point adding operation with the subsidiary teaching device 109, according to the processing flow 901 of FIG. 9, the user level pass word input demanding image plane 801 is displayed as shown in FIG. 8. On this image plane 801, the production line worker inputs a user level pass word which is given by the supervisor. Next, according to the processing flow 902 of FIG. 9, the level of the inputted pass word is judged.

The pass word inputted on the image plane 801 is transmitted to CPU 103 via the corresponding section 104, and CPU 103 judges the level of the inputted pass word according to the processing flow 902 shown in FIG. 9. As a result of the judgment, an indication of warning is transmitted to the subsidiary teaching device 109 via the corresponding section 104. In the other embodiments, the same judgment processing is conducted.

Figure 5:
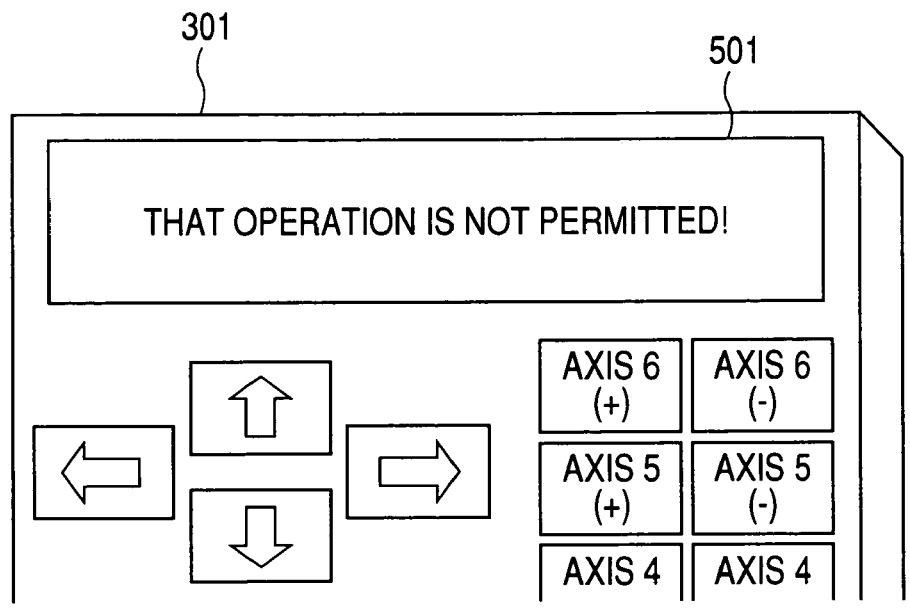
FIG. 5 is a front view showing an indication of warning in Embodiment 2 of the industrial robot of the present invention.

Since the production line worker is the user level 1, the user level pass word inputted by the production line worker is judged to be the user level 1, and the process proceeds to the processing flow 903 and the warning indication 501 of FIG. 5 is displayed and further an indication that the operation is not permitted is displayed. It is impossible for the production line worker to add the teaching point which has been set so that the addition can not be executed in the subsidiary teaching device 109.

Next, referring to FIG. 9, explanations will be made into a case of processing in which the programmer of the user level 2, who is permitted to add and delete the teaching point, conducts the teaching point adding operation by operating the industrial robot with the subsidiary teaching device 109. Since the programmer is the user level 2, according to the subsidiary teaching device setting image plane 701 shown in FIG. 7 which has been set by the supervisor with the primary teaching device 108 or 201, the teaching point adding operation is not permitted.

In the case where the programmer conducts the teaching point adding operation with the subsidiary teaching device 109, according to the processing flow 901 shown in FIG. 9, the user level pass word input demanding image plane 801 is displayed as shown in FIG. 8. The user level pass word, which is given from the supervisor to the programmer, is inputted onto the image plane 801. According to the processing flow 902 shown in FIG. 9, the level judgment processing to judge the thus inputted pass word is executed according to the processing flow 902 shown in FIG. 9. Since the programmer is the user level 2, the user level pass word inputted by the programmer is judged to be the user level 2, and the process proceeds to the processing flow 904 and the completion indication 601 of FIG. 6 is displayed. In this way, the indication that the processing has been completed is displayed, and the operation of adding the teaching point is executed.

Next, the processing is shown in FIG. 9 in which the supervisor of the level 3 in charge of the production line operates the industrial robot with the subsidiary teaching device 109 and conducts the operation of adding the teaching point. Since the supervisor is the user level 3, according to the subsidiary teaching device setting image plane 701 shown in FIG. 7 which has been set by the supervisor with the primary teaching device 108, the teaching point adding operation is permitted.

In the case where the supervisor conducts the teaching point adding operation with the subsidiary teaching device 109, according to the processing flow 901 shown in FIG. 9, the user level pass word input demanding image plane 801 is displayed as shown in FIG. 8. The supervisor inputs the user level pass word of the supervisor himself onto this image plane 801. Next, according to the processing flow 902 shown in FIG. 9, the level judgment processing of the inputted pass word is conducted. Since the supervisor is the user level 3, the user level pass word inputted by the supervisor is judged to be the user level 3, and the process proceeds to the processing flow 905 and the completion indication of FIG. 6 is displayed. In this way, the indication that the processing has been completed is displayed, and the operation of adding the teaching point is executed.

As described above, according to this embodiment, the operation capable of being conducted by the subsidiary teaching device is classified by the primary teaching device as the user level, and the subsidiary teaching device is made to have the user level judging function. Due to the above constitution, when the production line worker or the programmer operates the subsidiary teaching device and inputs the user level of himself, the contents capable of being operated are restricted. Therefore, a plurality of levels can be provided in the operation which can be conducted by the production line worker and the programmer.

In this connection, in Embodiment 3, the items, which can be set by the supervisor with the primary teaching device 108 to be valid or invalid on the subsidiary teaching device setting image plane 701 in FIG. 7, are the change in the tool tip end position, the change in the tool posture, the addition of the teaching point, the deletion of the teaching point, the change in the teaching point velocity, and the change in the welding condition. However, the function of setting to be valid or invalid on the subsidiary teaching device setting image plane 701 is not particularly limited. For example, the change in the output state, the change in the waiting time and the change of ON/OFF of the hand opening and closing device may be set on the subsidiary teaching device setting image plane 401.

Embodiment 4

Next, referring to FIGS. 10 and 11, explanations will be made into an industrial robot characterized in that the primary teaching device and the subsidiary teaching device are replaced with each other. Like reference characters are used to indicate like parts in Embodiments 1 and 4, and the detailed explanations are omitted here.

Figure 10:
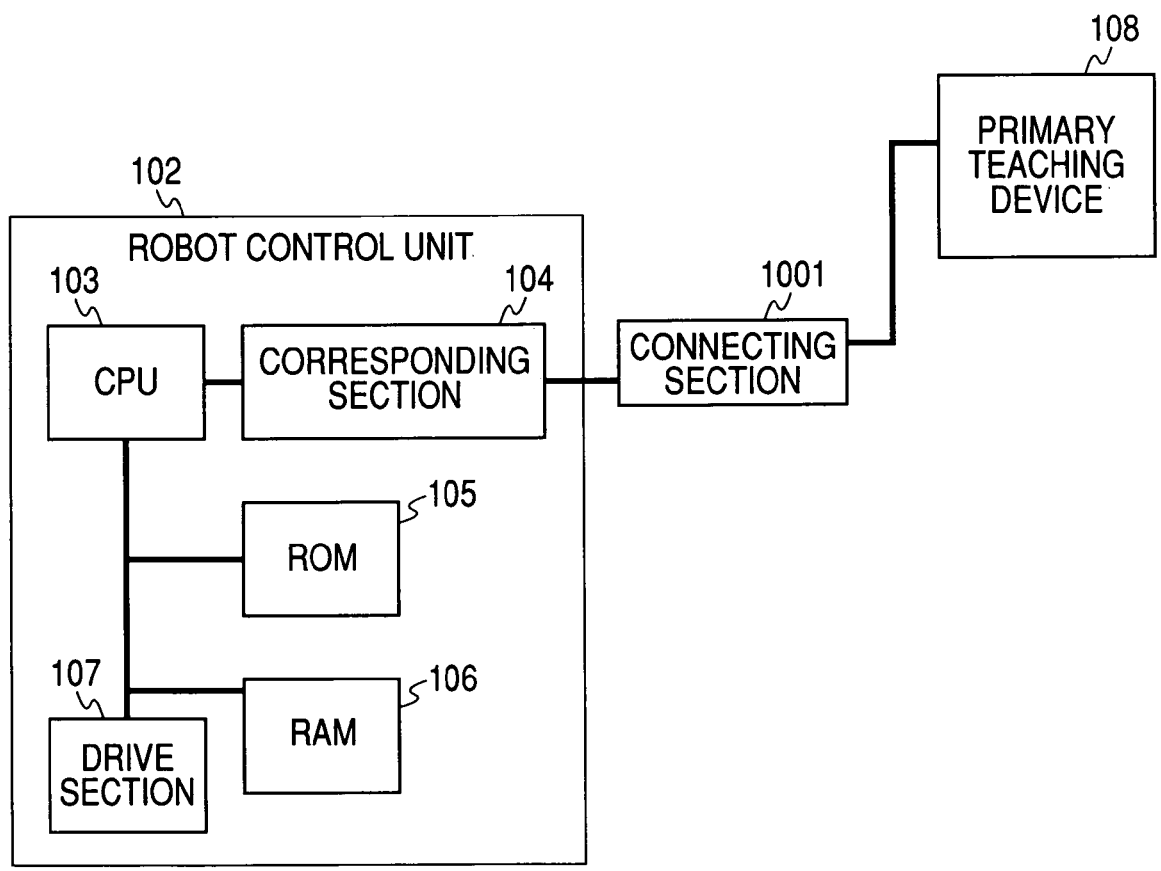
FIG. 10 is a block diagram showing an arrangement of Embodiment 4 of the industrial robot of the present invention.
Figure 11:
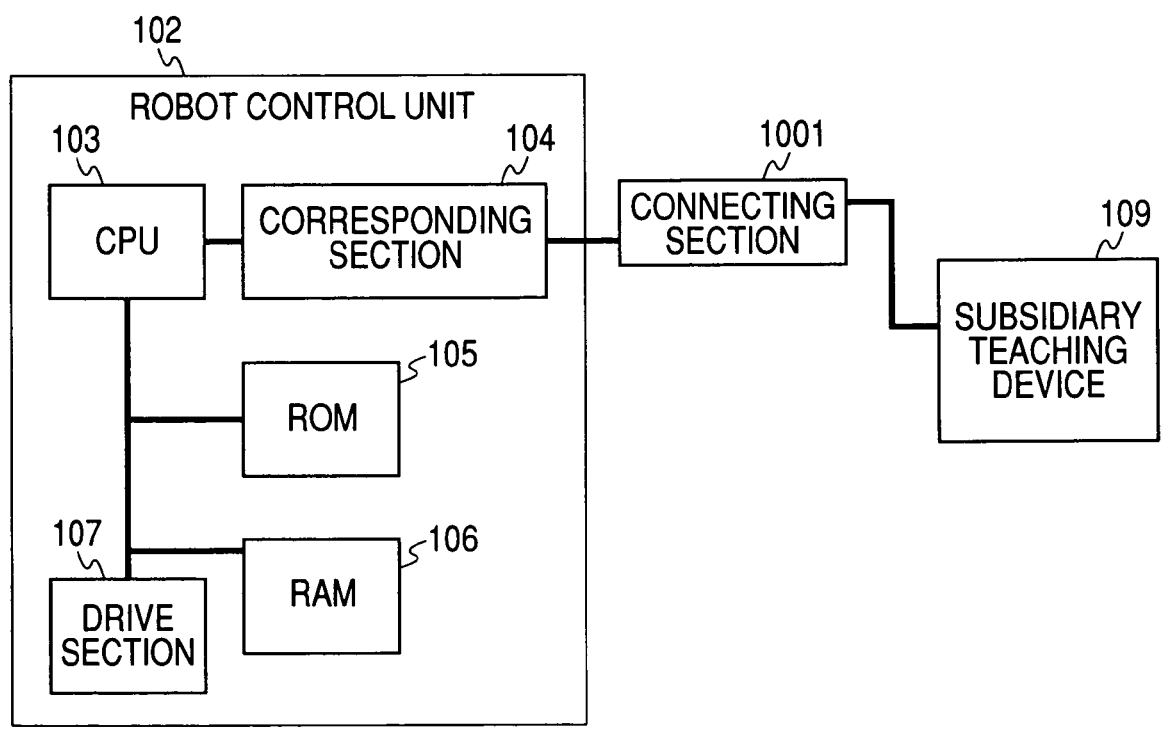
FIG. 11 is a block diagram showing an arrangement of Embodiment 4 of the industrial robot of the present invention.

FIGS. 10 and 11 are views showing an arrangement of the industrial robot to realize the present invention. Reference numeral 1001 is a connecting section for connecting the primary teaching device 108 or the subsidiary teaching device 109 to the robot control unit 102. As long as this connecting section 1001 can be connected to the primary teaching device 108 and the subsidiary teaching device 109, the shape of this connecting section 1001 is not particularly limited to a specific one.

In the case where the supervisor uses the primary teaching device 108, only the primary teaching device 108 is connected to the connecting section 1001 as shown in FIG. 10. In the same manner as that described in Embodiments 1 and 2, the supervisor makes an operation program with the primary teaching device 108, the operation program is selected and the starting operation is conducted and the operation capable of being conducted by the subsidiary teaching device is restricted.

Next, before the production line worker uses the industrial robot, the supervisor detaches the primary teaching device 108 from the connecting section 1001 and attaches only the subsidiary teaching device 109 to the connecting section 1001 as shown in FIG. 11.

In the case where the production line worker corrects the teaching program of an industrial robot, which is being operated now, with the subsidiary teaching device 109 and also in the case where the production line worker continuously runs the operation program and makes the industrial robot conduct the welding or handling work, the production line worker selects the objective operation program with the subsidiary teaching device 109 and conducts the starting operation in the same manner as that of Embodiments 1 and 2.

As described above, according to this embodiment, before the production line worker uses an industrial robot, the supervisor detaches the primary teaching device and replaces it with the subsidiary teaching device. Due to the foregoing, the production line worker can use only the subsidiary teaching device. Therefore, it becomes possible to prevent the production line worker from executing the industrial robot function which is originally to be executed by the supervisor.

Embodiment 5

Next, referring to FIGS. 12 and 13, explanations will be made into an industrial robot, the robot control unit of which includes a storage device for storing information to restrict the operation when the primary teaching device or the subsidiary teaching device is connected to the robot control unit.

Like reference characters are used to indicate like parts in Embodiments 1, 2, 3, 4 and 5, and the detailed explanations are omitted here.

Figure 12:
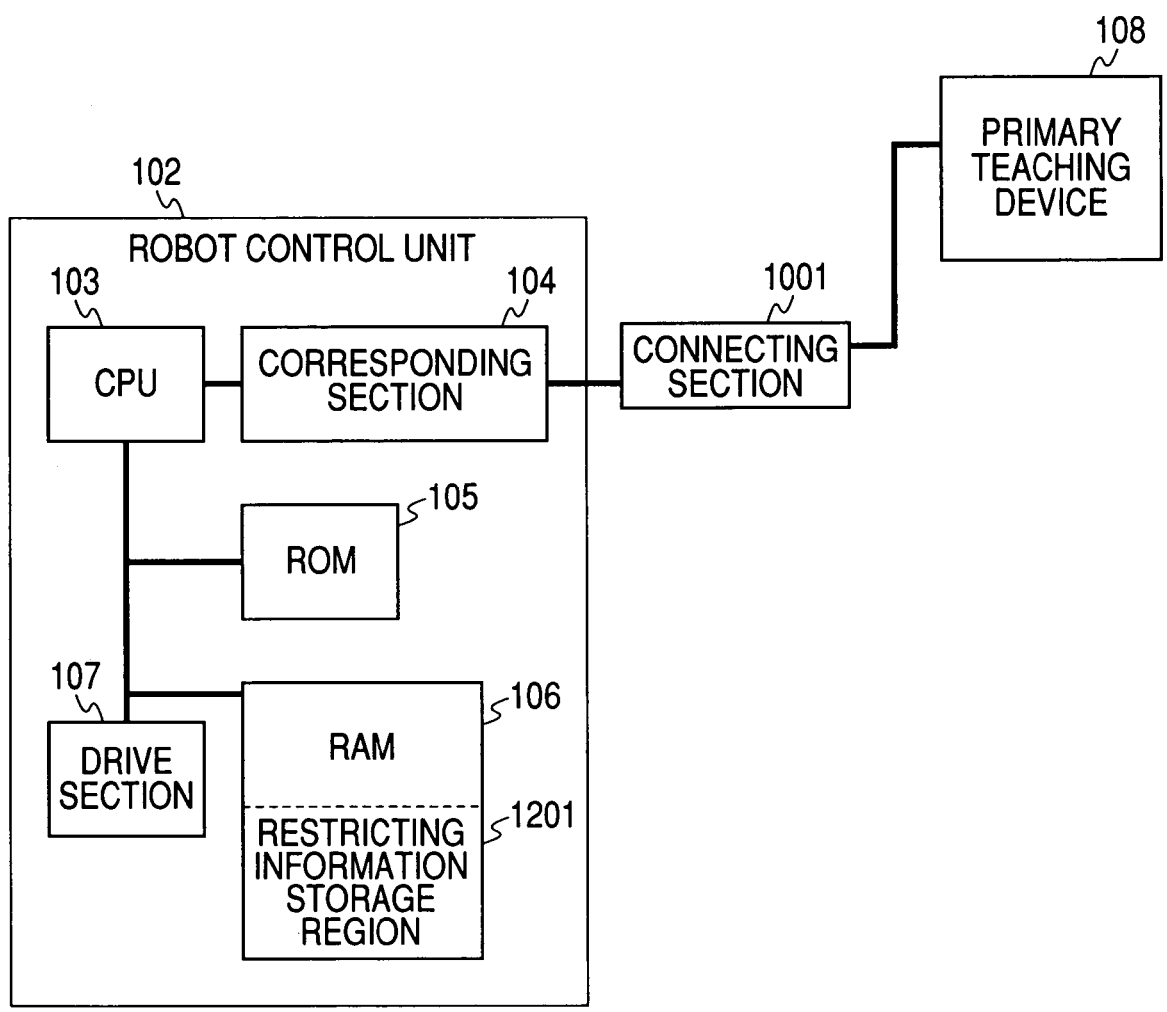
FIG. 12 is a block diagram showing an arrangement of Embodiment 5 of the industrial robot of the present invention.

FIG. 12 is a view showing an arrangement of the industrial robot to realize the present invention. Reference numeral 1201 is a storage device for storing the information to restrict the operation. In this case, a portion of RAM, which is a memory for accommodating, writing and reading the operation program and the operation environment setting program taught by the worker, is used as a restricting information storing region.

The supervisor calls the subsidiary teaching device setting image plane 401 to restrict the operation, which can be conducted by the subsidiary teaching device 109, with the primary teaching device 108 and conducts the setting of the function of restricting the operation when the production line worker operates the subsidiary teaching device. Then, the information indicating whether the respective operation is valid or invalid is automatically stored in the restricting information storage region 1201 via the connecting section 1001, the corresponding section 104 and CPU 103. Alternatively, the information indicating whether the respective operation is valid or invalid is stored in the restricting information storage region 1201 via the connecting section 1001, the corresponding section 104 and CPU 103 when the operation button of the primary teaching device 108 is pressed. Concerning the way of storing the information whether it is valid or invalid may be stored for the respective operation. Alternatively, the valid operation area and the invalid operation area, which is restricted, may be made, and the operation fitted to the respective area may be stored.

Figure 13:
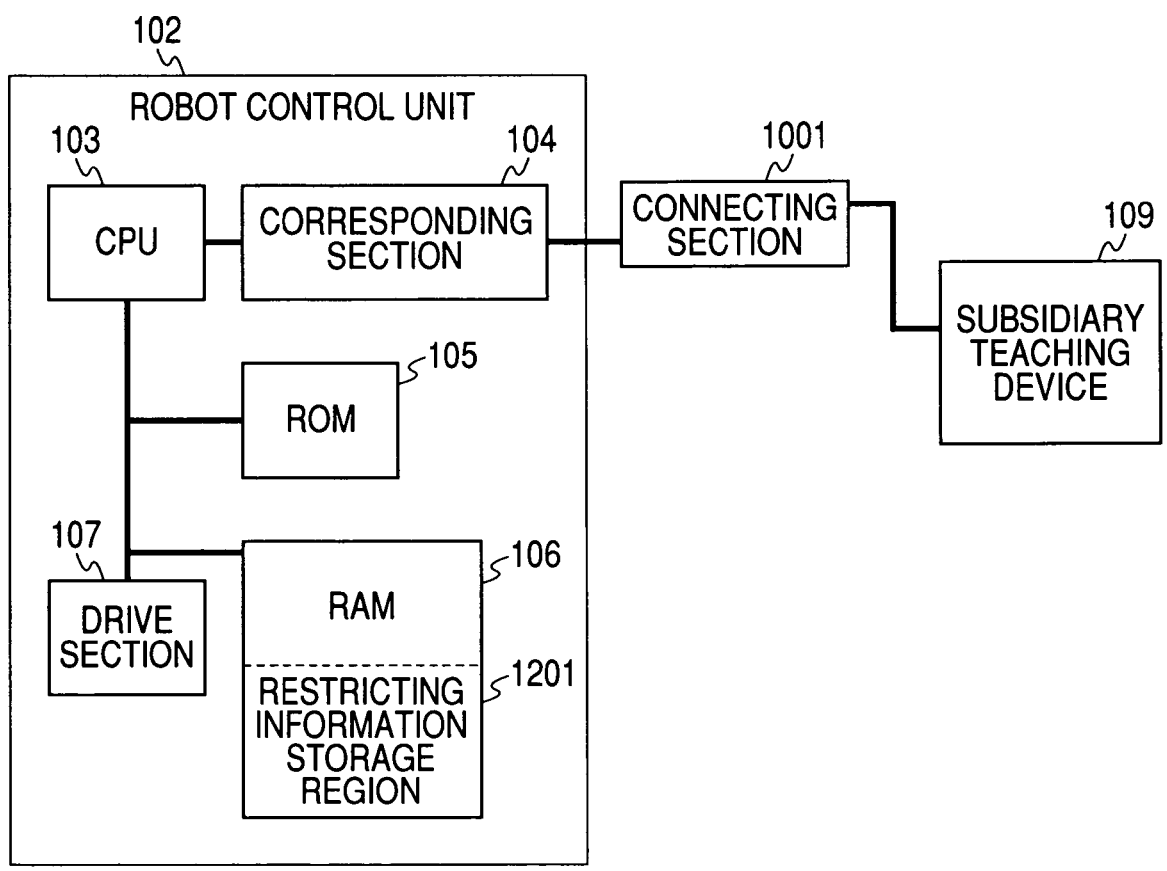
FIG. 13 is a block diagram showing an arrangement of Embodiment 5 of the industrial robot of the present invention.

Next, before the production line worker uses the industrial robot, the supervisor detaches the primary teaching device 108 from the connecting section 1001 and attaches only the subsidiary teaching device 109 to the connecting section 1001 as shown in FIG. 13.

Next, explanations will be made into a case in which the production line worker works with the subsidiary teaching device 109. For example, as shown by the subsidiary teaching device setting image plane 401 of FIG. 4, while using the primary teaching device 108, the supervisor conducts setting as follows. The change in tool tip end position is valid, the change in the tool posture is invalid, the change in the teaching point addition is invalid, the change in the teaching point is valid, the deletion of the teaching point is invalid, the change in the teaching point velocity is valid, and the change in the welding condition is valid. Then, the above pieces of information are stored in the restricting information storing region 1201. In this case, although the operation of changing the teaching point is permitted, the change in the tool posture is not permitted. In the above circumstances, when the production line worker operates the industrial robot with the subsidiary teaching device 109 and changes the tool posture and then conducts the teaching point changing operation, the information to restrict the operation is transmitted to the subsidiary teaching device 109 via CPU 103, the corresponding section 104 and the connection 1001. According to the thus transmitted information, the subsidiary teaching device 109 displays an indication that the operation is not permitted as shown by the warning display 501 in FIG. 5. In CPU 103, programming is made so that a command can not be given to the manipulator 101 with respect to the operation which is stored in the restricting information storing region 1201 to be invalid. Accordingly, the operation of changing the teaching point, which is accompanied by the change in the tool posture, can not be executed.

As described above, according to this embodiment, the industrial robot includes a function of restricting the operation capable of being conducted by the subsidiary teaching device. Therefore, the production line worker uses only the subsidiary teaching device. Accordingly, it is possible to prevent the production line worker from executing the industrial robot function which is originally to be executed by the supervisor.

Embodiment 6

Next, referring to FIGS. 1, 2, 14, 15, 16 and 17, explanations will be made into an industrial robot in which the primary teaching device and the subsidiary teaching device are simultaneously connected to the robot control unit and the primary teaching device is provided with a user judging function.

Like reference characters are used to indicate like parts in Embodiments 1, 2, 3, 4 and 6, and the detailed explanations are omitted here.

Figure 14:
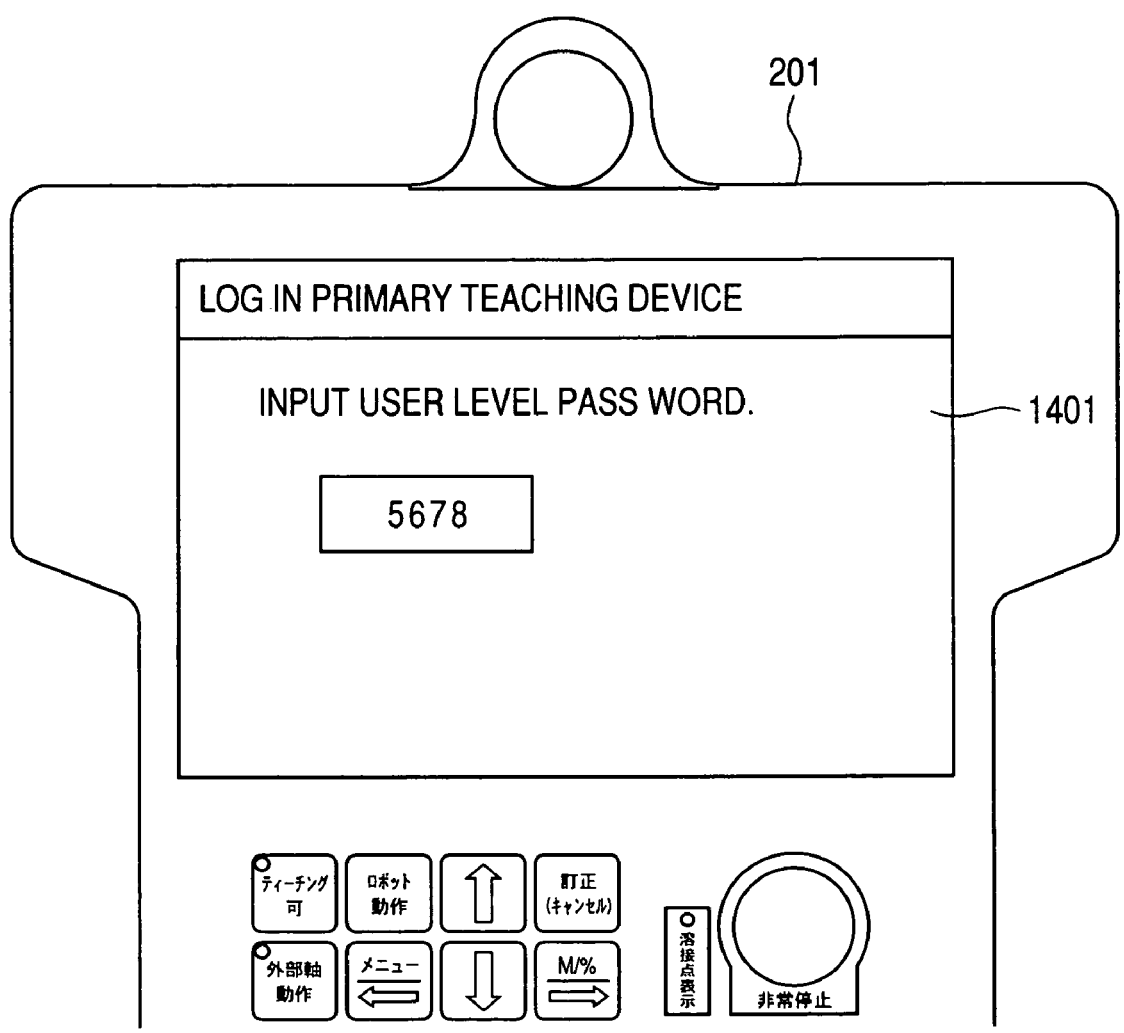
FIG. 14 is a front view showing an image plane of inputting a user level pass word in Embodiment 6 of the industrial robot of the present invention.

In the case where the supervisor operates the primary teaching device 201 in order to conduct the operation, which is permitted only for the supervisor, such as the operation of making an operation program or restricting the operation capable of being conducted by the subsidiary teaching device, first, the user level pass word input demanding image plane 1401 shown in FIG. 14 is displayed on a liquid crystal image plane.

In this case, the user level 3 represents the highest level. For example, the supervisor corresponds to the user level 3 who is in charge of the production line and capable of operating all functions of the industrial robot.

Next, the user level 2 represents the intermediate level. For example, the programmer corresponds to the user level 2 who is permitted only to teach the operation program and not permitted to conduct the operation to restrict the operation capable of being conducted by the subsidiary teaching device.

Next, the user level 1 represents the lowest level. For example, the production line worker corresponds to the user level 1 who is permitted only to change the teaching points and not permitted to conduct the operation of teaching the operation program or restricting the operation capable of being conducted by the subsidiary teaching device.

Figure 15:
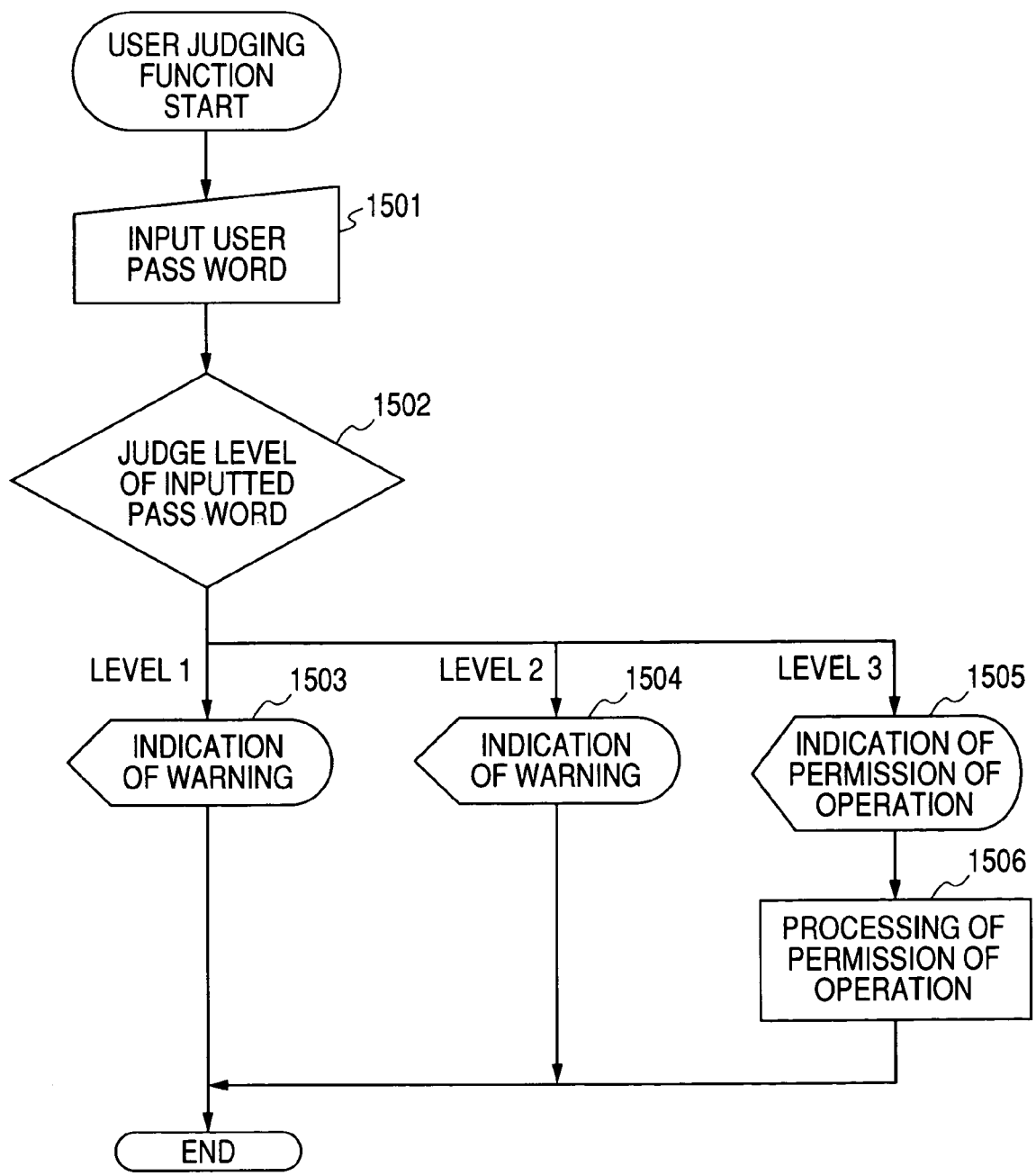
FIG. 15 is a flow chart of processing in Embodiment 6 of the industrial robot of the present invention.
Figure 16:
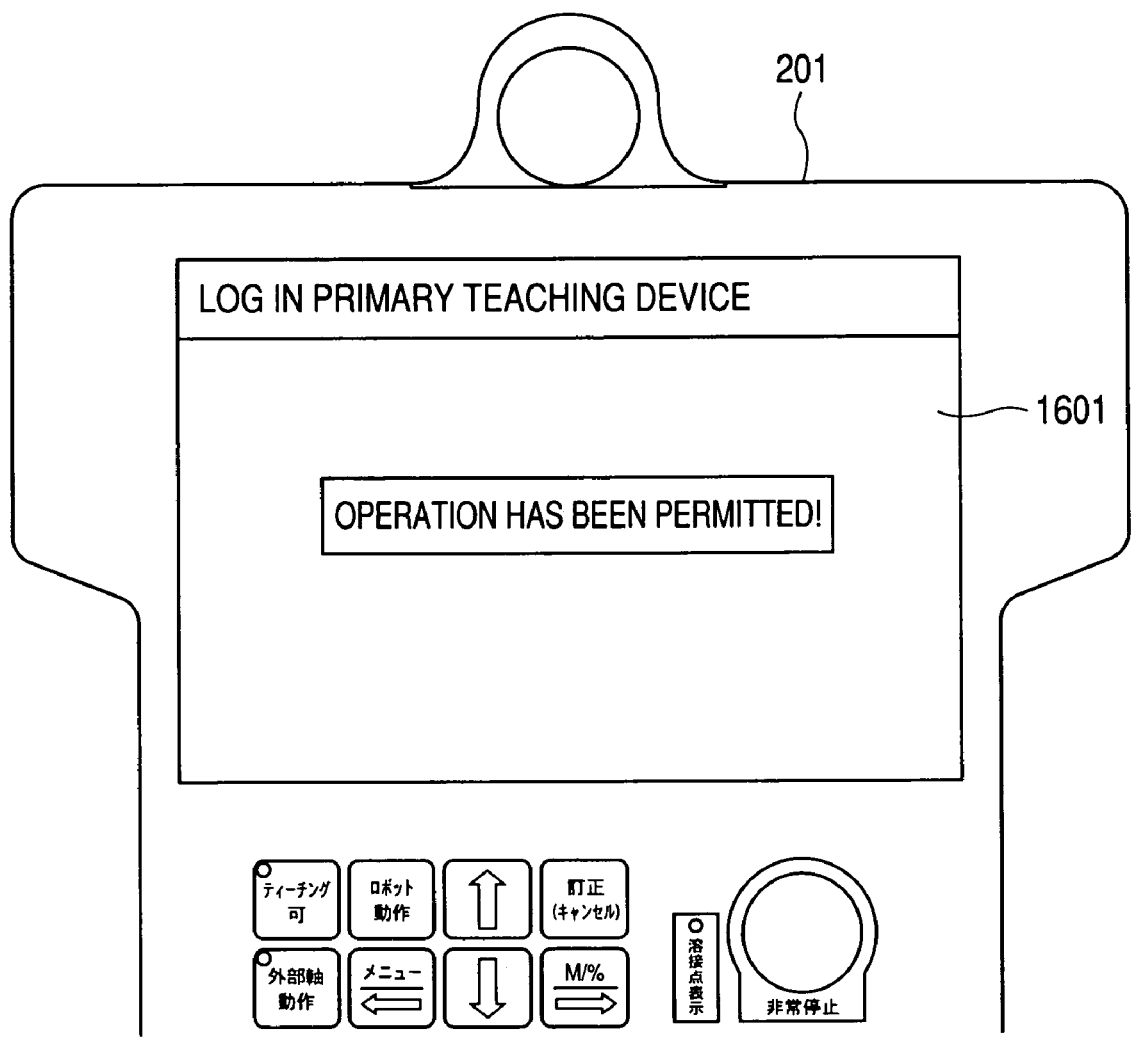
FIG. 16 is a block diagram showing an indication of permitting the operation in Embodiment 6 of the industrial robot of the present invention.

In the case where the supervisor of the user level 3 in charge of the production line operates the primary teaching device 201 in order to conduct the operation, which is permitted only for the supervisor, such as the operation of making the operation program or restricting the operation capable of being conducted by the subsidiary teaching device, according to the processing flow 1501 of FIG. 15, the user level pass word input demanding image plane 1401 is displayed as shown in FIG. 14. On this image plane 1401, the user pass word of the supervisor himself is inputted. Next, according to the processing flow 1502, the level of the thus inputted pass word is judged. Since the supervisor is the user level 3, the user level pass word inputted by the supervisor is judged to be the user level 3. Then, the process proceeds to the processing flow 1505, and the operation permitting indication 1601 shown in FIG. 16 is displayed, that is, the indication to permit the operation is displayed. Successively, the process proceeds to the processing flow 1506, and the operation program is actually made and the permission processing of permitting the operation to restrict the operation capable of being conducted by the subsidiary teaching device is executed.

Figure 17:
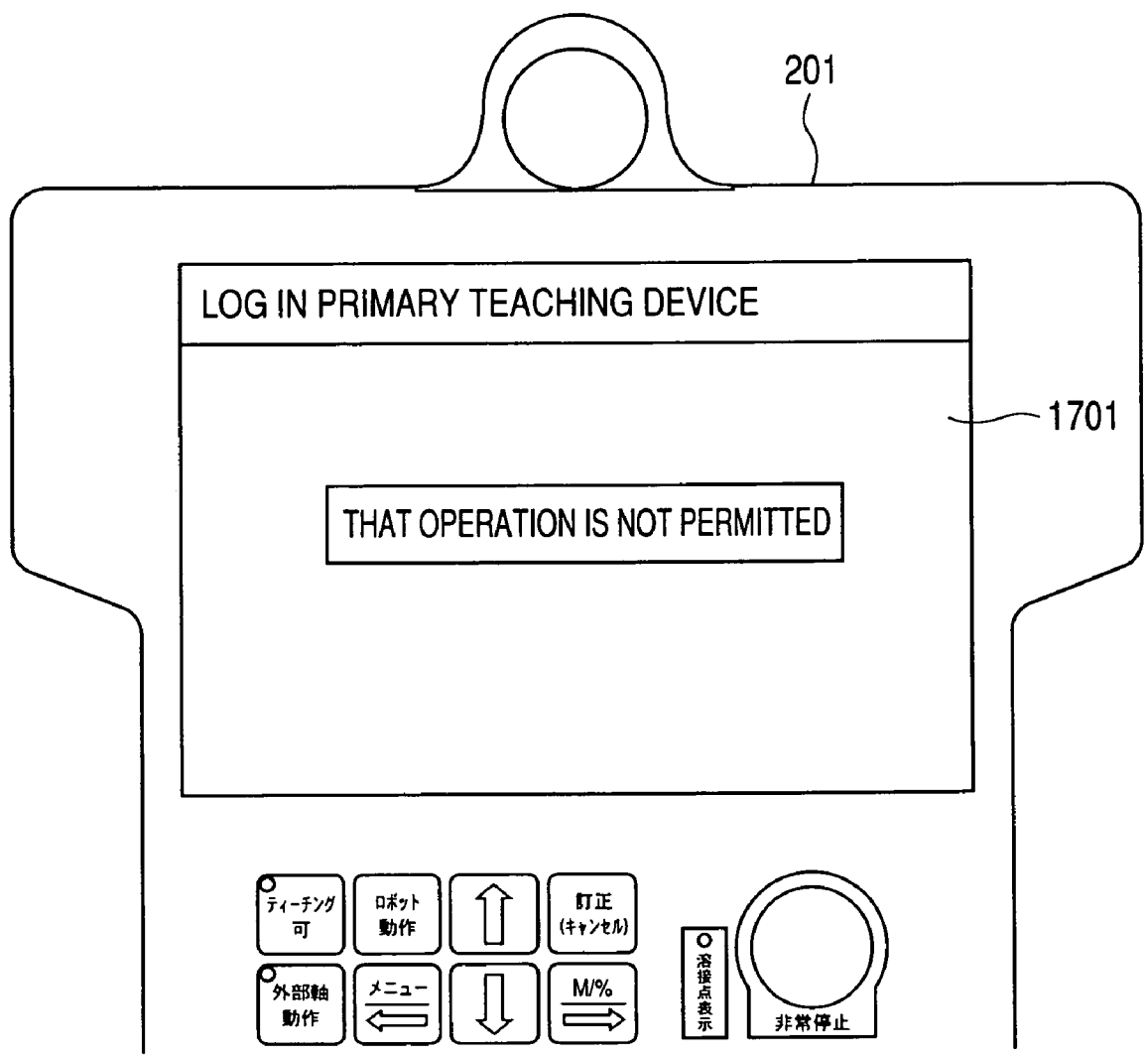
FIG. 17 is a front view showing an indication of warning in Embodiment 6 of the industrial robot of the present invention.
Figure 18:
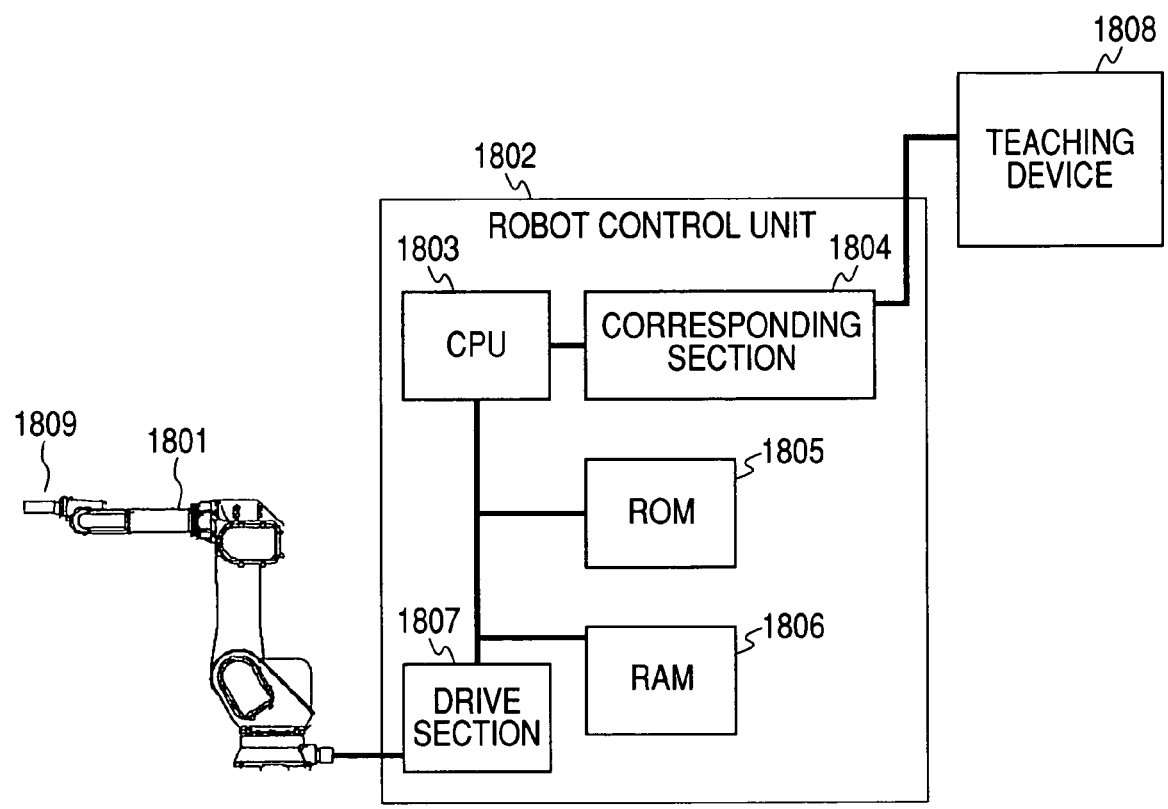
FIG. 18 is a block diagram showing an arrangement of the conventional industrial robot.

Next, in the case where the production line worker of the user level 1 operates the primary teaching device 201 in order to conduct the operation permitted only for the supervisor such as the operation of making the operation program or restricting the operation capable of being conducted by the subsidiary device, according to the processing flow 1501 shown in FIG. 15, the user level pass word input demanding image plane 1401 is displayed as shown in FIG. 14. On this image plane 1401, the user level pass word of the production line worker himself is inputted. According to the next processing flow 1502, the level of the thus inputted pass word is executed. Since the production line worker is the user level 1, the user level pass word inputted by the production line worker is judged to be the user level 1. Then, the process proceeds to the processing flow 1503 and the warning indication 1701 shown in FIG. 17 is displayed, that is, the indication that the operation is prohibited is displayed. Therefore, the production line worker can not conduct the operation, which is permitted only for the supervisor, such as the operation of successively making the operation program or restricting the operation capable of being conducted by the subsidiary teaching device. The method of restricting the operation is the same as that of Embodiment 5.

In the same manner as that of Embodiments 1, 2, 3, 4, 5 and 6, in the case where the production line worker corrects a teaching program of the industrial robot which is being operated in the production line, the correcting operation is conducted only by the subsidiary teaching device.

As described above, according to this embodiment, when the primary teaching device and the secondary teaching device are simultaneously connected to the robot control unit and the primary teaching device is provided with a user judging function, it is impossible for the production line worker to use the primary teaching device, that is, the production line worker can use only the subsidiary teaching device. Accordingly, it is possible to prevent the production line worker from executing the function of an industrial robot which is originally to be executed by the supervisor.

INDUSTRIAL APPLICABILITY

The present invention can realize an industrial robot including a primary teaching device and a subsidiary teaching device and also including a function to restrict the operation capable of being conducted by the subsidiary teaching device. Therefore, when the production line worker uses only the subsidiary device, it is possible to prevent the production line worker from executing the function of the industrial robot which is originally to be executed by the supervisor. Accordingly, the industrial robot of the present invention is useful for the industry as an industrial robot having the function of restricting the operation of the worker.

The invention claimed is:

1. An industrial robot comprising:
   a manipulator having a tool at a tip end;
   a robot control unit for controlling the manipulator; and
   a primary teaching device and a subsidiary teaching device each for controlling the manipulator through the robot control unit,
   wherein the number of operations that the subsidiary teaching device is allowed to conduct is less than the number of operations that the primary teaching device is allowed to conduct, and
   wherein the robot control unit includes a storage device for storing restrict information indicating valid and invalid operations of the subsidiary teaching device.

2. An industrial robot according to claim 1, wherein the operations that the subsidiary teaching device is allowed to conduct are determined by validating the operations that the subsidiary teaching device is allowed to conduct and invalidating the operations that the subsidiary teaching device is not allowed to conduct in the primary teaching device.

3. An industrial robot according to claim 2, wherein the operations that the subsidiary teaching device is allowed to conduct are classified into a plurality of user levels based on the allowability of the operations by the primary teaching device, and the subsidiary teaching device includes a user level judging function for judging the user level of the operation.

4. An industrial robot according to claim 1 or 2, wherein the primary teaching device and subsidiary teaching device are detachably attached to the robot control unit, and either the primary teaching device or the subsidiary teaching device is connected to the robot control unit.

5. An industrial robot according to claim 4, wherein the restrict information is stored in the storage device when the primary teaching device or the subsidiary teaching device is connected to the robot control unit.

6. An industrial robot according to claim 1, wherein the primary teaching device and subsidiary teaching device are simultaneously connected to the robot control unit, and the primary teaching device includes a user judging function.

* * * * *

UNITED STATES PATENT AND TRADEMARK OFFICE
CERTIFICATE OF CORRECTION

| | | |
|---|---|---|
| PATENT NO. | : 7,627,396 B2 | Page 1 of 1 |
| APPLICATION NO. | : 10/534669 | |
| DATED | : December 1, 2009 | |
| INVENTOR(S) | : Ikeda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twenty-first Day of December, 2010

David J. Kappos
*Director of the United States Patent and Trademark Office*